United States Patent
Chang

(10) Patent No.: US 7,031,758 B2
(45) Date of Patent: Apr. 18, 2006

(54) MOBILE PHONE WITH TWO INPUT MODES

(75) Inventor: Suli Chang, Tu-Chen (TW)

(73) Assignee: Fih Co., Ltd., Shindian (TW)

( * ) Notice: Subject to any disclaimer, the term of this patent is extended or adjusted under 35 U.S.C. 154(b) by 497 days.

(21) Appl. No.: 10/302,074

(22) Filed: Nov. 21, 2002

(65) Prior Publication Data

US 2004/0198307 A1    Oct. 7, 2004

(30) Foreign Application Priority Data

Sep. 11, 2002  (TW) .............................. 91214234 U

(51) Int. Cl.
*H04B 1/38*    (2006.01)
*H04B 1/08*    (2006.01)

(52) U.S. Cl. .................. 455/575.1; 455/90.3; 455/347; 455/575.4; 379/433.01

(58) Field of Classification Search .............. 455/90.3, 455/347–349, 575.1, 575.3, 575.4, 550.1, 455/552.1, 556.2, 566; 379/433.01, 433.04, 379/433.07, 433.11, 433.12, 433.13
See application file for complete search history.

(56) References Cited

U.S. PATENT DOCUMENTS

| | | | | |
|---|---|---|---|---|
| 5,694,299 A * | 12/1997 | Mori | ........................... | 361/814 |
| 6,052,606 A * | 4/2000 | Bowen | ........................ | 455/566 |
| 6,128,475 A * | 10/2000 | Wicks et al. | .............. | 455/575.4 |
| 6,397,078 B1* | 5/2002 | Kim | ......................... | 455/556.2 |
| 6,542,721 B1* | 4/2003 | Boesen | ....................... | 455/553.1 |
| 2003/0038786 A1* | 2/2003 | Nguyen et al. | .............. | 345/169 |
| 2003/0064685 A1* | 4/2003 | Kim | ............................ | 455/90 |

* cited by examiner

*Primary Examiner*—Simon Nguyen
(74) *Attorney, Agent, or Firm*—Wei Te Chung

(57) ABSTRACT

A mobile phone (1) includes a main body (3), a keypad (5), and a pair of fasteners (7, 9) slidably and pivotally attaching the keypad to the main body. The main body has a housing (2) with a recess (31) defined in a lower portion thereof. The keypad is received in said recess and comprises a front panel (51) for a keypad input mode and a back panel (53) for a touch screen input mode. A switch between two input modes is achieved by sliding and rotating the keypad around the pair of fasteners to display one side or another side.

22 Claims, 6 Drawing Sheets

MOBILE PHONE WITH TWO INPUT MODES

FIELD OF THE INVENTION

The present invention relates to portable electronic devices, and particularly to a mobile phone having improved input modes.

BACKGROUND OF THE INVENTION

In recent years, mobile phones have acquired more and more functions, and a great amount of information needs to be input into the mobile phones to utilize most of these functions. However, traditional mobile phones, as disclosed in U.S. Pat. No. D436,582, only have a keypad input mode, which has a slow input speed and a troublesome operation. Thus, these phones cannot satisfy a requirement of quickly inputting a large amount of information. As the amount of information increases, the problem becomes more serious.

To overcome the above-mentioned problem, U.S. Pat. No. 6,397,078 illustrates a portable electronic device which attains two input modes by combining a mobile phone with a personal digital assistant (PDA). In an embodiment thereof, the mobile phone of the portable electronic device has two available input modes. However, said portable electronic device is cumbersome and a switch of the input modes is not convenient.

Therefore, an improved mobile phone is desired to overcome the disadvantages of the prior art.

SUMMARY OF THE INVENTION

A main object of the present invention is to provide a compact mobile phone which provides a choice of two input modes.

Another object of the present invention is to provide a mobile phone which provides a choice of two input modes easy to switch.

A mobile phone of the present invention comprises a main body, a keypad, and a pair of fasteners slidably and pivotally attaching the keypad to the main body. The main body has a housing with a recess defined in a lower portion thereof, and a main printed circuit board (PCB) received in the housing. The keypad received in said recess comprises a front panel with a key operating section, a back panel with a touch screen, and a keypad PCB between said front and back panels. The keypad PCB comprises a front PCB, a back PCB and an insulative layer sandwiched between the front and back PCBs. A switch between two input modes is achieved by switching an electrical connection between the main PCB and the front and back PCBs by sliding and rotating the keypad around the pair of fasteners from one side to another side.

Other objects, advantages and novel features of the invention will become more apparent from the following detailed description of a preferred embodiment thereof when taken in conjunction with the accompanying drawings, wherein:

DETAILED DESCRIPTION OF THE INVENTION

Figure 1:
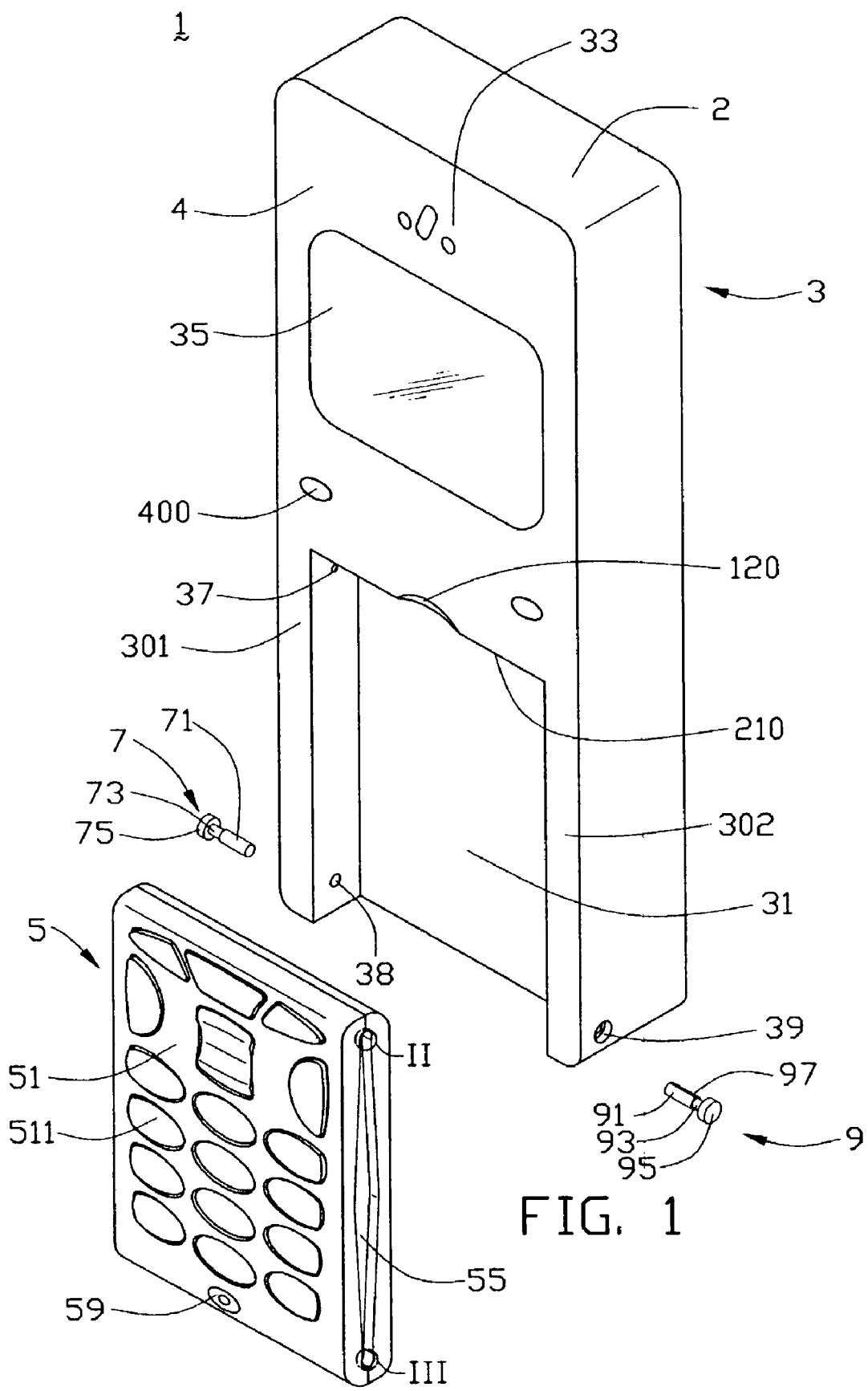
FIG. 1 is an exploded, perspective view of a mobile phone in accordance with a preferred embodiment of the present invention.

Referring now to the drawings in detail, FIG. 1 shows a mobile phone 1 in accordance with a preferred embodiment of the present invention. The mobile phone 1 comprises a main body 3, a keypad 5, and two bolts 7, 9 to mount the keypad 5 to the main body 3.

The main body 3 comprises a housing 2 with a front panel 4, and a main PCB 65 received in a space 200 (see FIGS. 7 and 8) defined by the housing 2. The front panel 4 has a receiver 33 and a display 35 in an upper portion, and a recess 31 in a lower portion. Said recess 31 is defined by a top surface 210 and two sidewalls 301, 302 of the housing 2. A pair of engaging holes 38, 39 is symmetrically formed in bottom ends of the corresponding sidewalls 301, 302. Two elastic tongues 61, 63 are respectively provided in the sidewalls 301, 302 adjacent to the engaging holes 38, 39 and the elastic tongue 63 electrically connects with the main PCB 65 (see FIGS. 7 and 8). A latch structure 37 is provided on an upper interior side of the sidewall 301.

The bolt 7 has a head portion 75, a neck portion 73 and a tail portion 71. The bolt 9 has a same structure as the bolt 7, comprising a head portion 95, a neck portion 93 and a tail portion 91. A conductive layer 97 is formed along a circumferential direction on one part of a surface of the tail portion 91, on the neck portion 93, and on a surface connecting the neck portion 93 with the tail portion 91.

Figure 2:
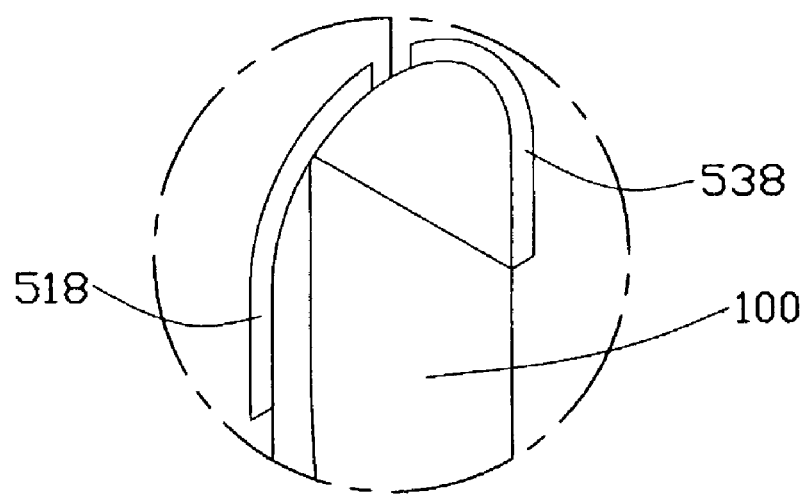
FIG. 2 is an enlarged view of an area within a circular line II of FIG. 1.
Figure 3:
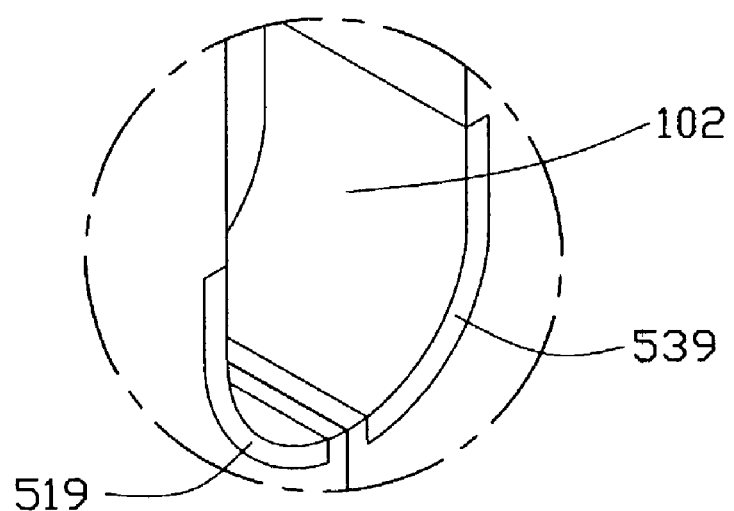
FIG. 3 is an enlarged view of an area within a circular line III of FIG. 1.
Figure 6:
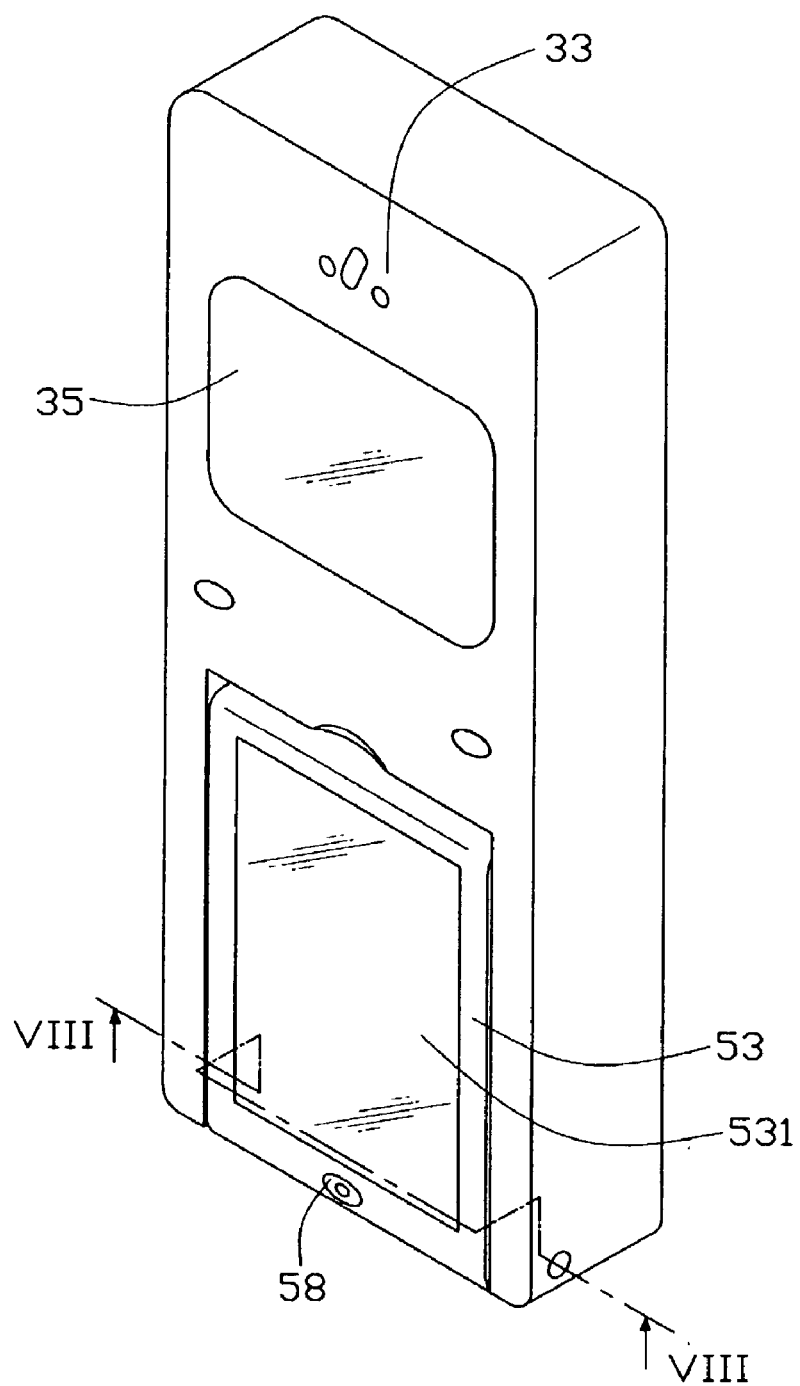
FIG. 6 is a perspective view of the mobile phone of FIG. 1 with the keypad in a reversed position.
Figure 7:
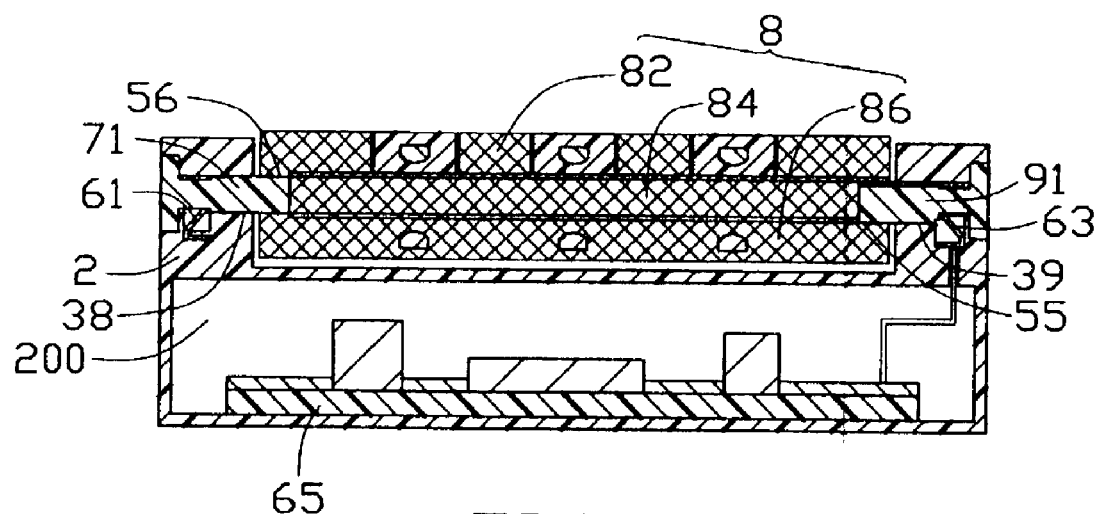
FIG. 7 is a cross-sectional view of FIG. 4 taken along line VII—VII.
Figure 8:
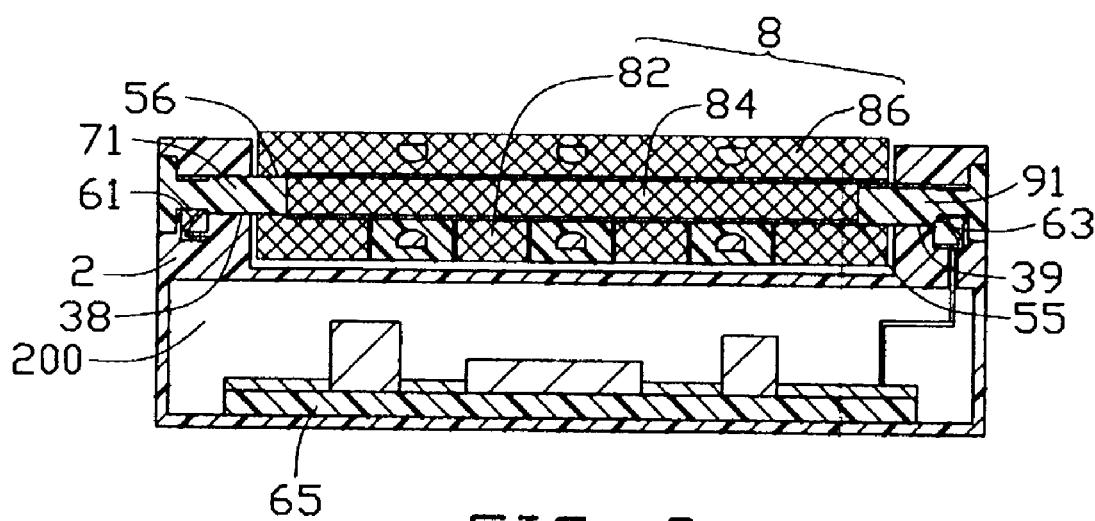
FIG. 8 is a cross-sectional view of FIG. 6 taken along line VIII—VIII.

Referring to FIGS. 1 and 6, the keypad 5 has a front panel 51 with a key operating section 511 and a transmitter 59, a back panel 53 with a touch screen 531 and a transmitter 58, and a keypad PCB 8 between the front panel 51 and the back panel 53 (see FIGS. 7 and 8). A pair of runners 55, 56 is formed in two lateral sides of the keypad 5, best seen in FIGS. 7 and 8. The right runner 55 has two ends 100, 102 (see FIGS. 2 and 3). The top end 100 has two separate metal pieces 518, 538, and the bottom end 102 has two separate metal pieces 519, 539. The keypad PCB 8 comprises a front PCB 82, a back PCB 86 and an insulative layer 84 sandwiched between the front PCB 82 and the back PCB 86 (see FIGS. 7 and 8).

Figure 4:
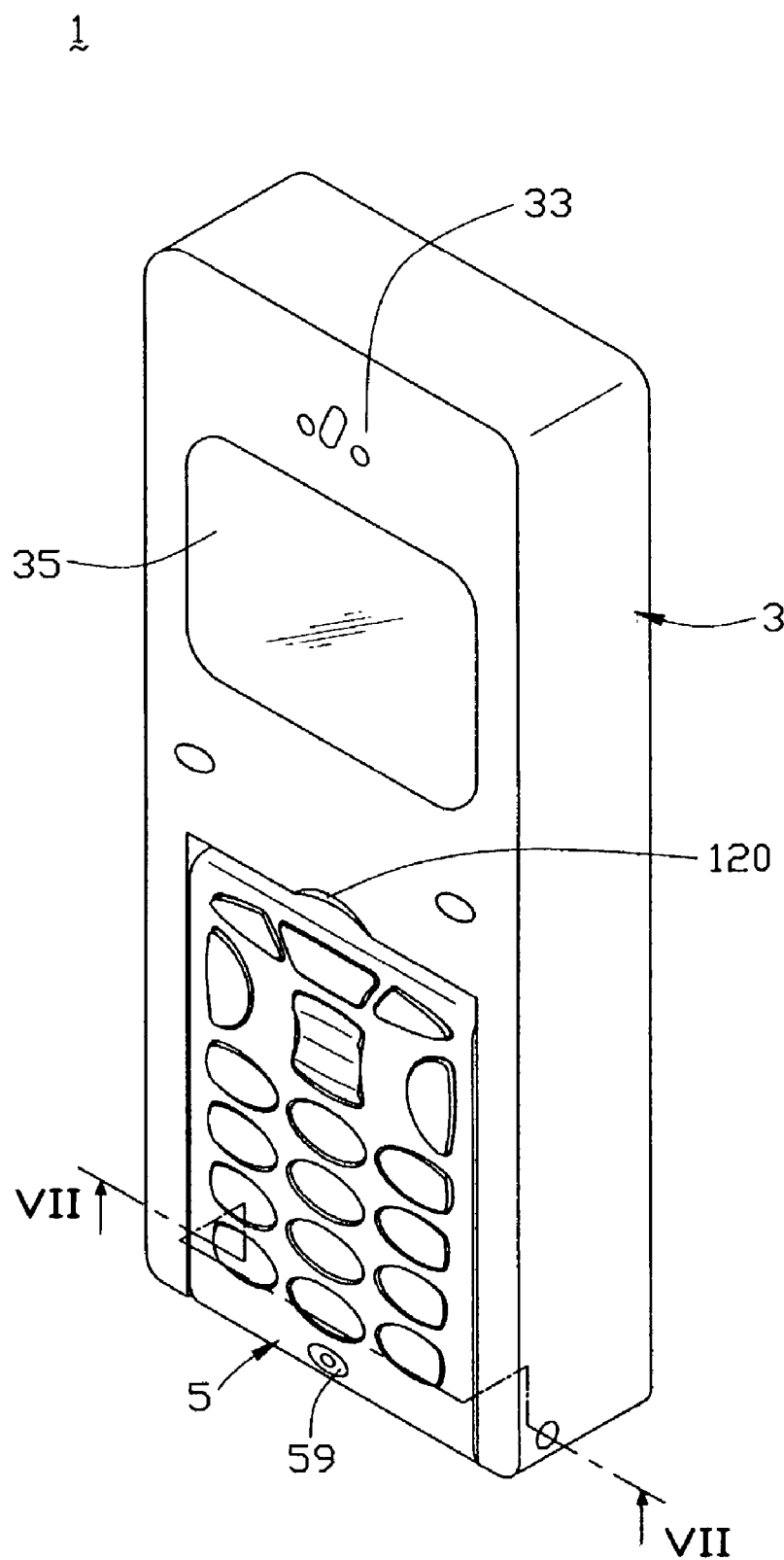
FIG. 4 is a perspective view of the assembled mobile phone of FIG. 1.

During assembly, the keypad 5 is firstly put into the recess 31 of the main body 3, and then the bolts 7, 9 are pushed into the corresponding engaging holes 38, 39. Thus the assembled mobile phone is attained as shown in FIG. 4. In this condition, the tail portions 71, 91 of the bolts 7, 9 extend into the corresponding runners 56, 55, and then the elastic tongues 61, 63 clasp the tail portions 71, 91 respectively to fix the bolts 7, 9 in the engaging holes 38, 39 and the conductive layer 97 of the bolt 9 contacts with the metal piece 519 and the elastic tongue 63, see FIG. 7. Thus an electrical connection between the main PCB 65 and the front PCB 82 is established. In addition, the latch structure 37 also protrudes into the runner 56 so as to fix the keypad 5 in the recess 31 for a keypad input mode.

Figure 5:
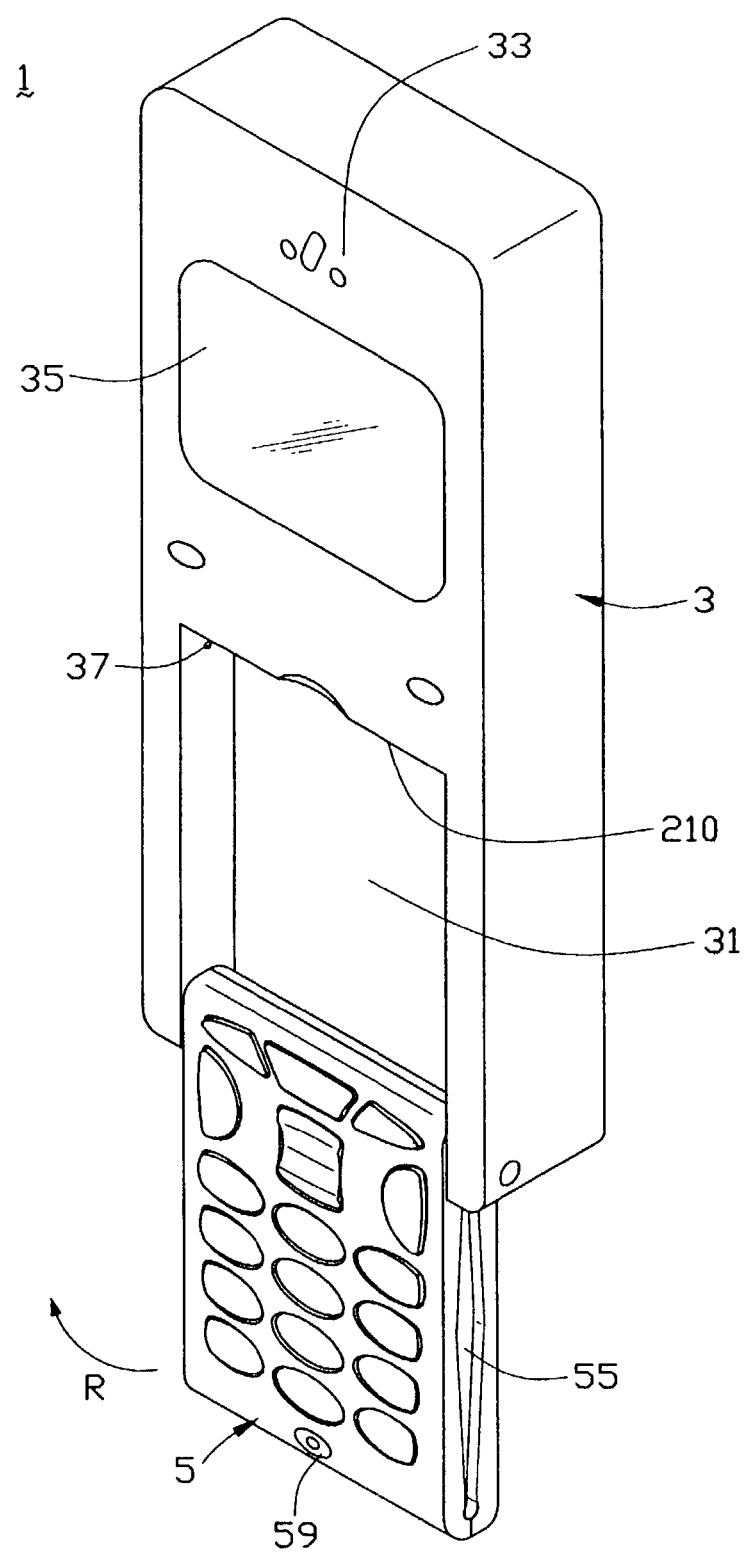
FIG. 5 is a perspective view of the mobile phone of FIG. 1 with a keypad in a lower position.

FIGS. 4–6 show the process of manipulating the keypad 5 when a user intends to change the mobile phone 1 from a keypad input mode to a touch screen input mode. Firstly, the keypad 5 is drawn downwardly from the recess 31 of the main body 3 until the top ends 100 of the runners 56, 55 respectively contact with the tail portions 71, 91 of the bolts 7, 9, as shown in FIG. 5. Then, the keypad 5 is rotated around the bolts 7, 9 until the keypad 5 is received in the recess 31 to display the touch screen 531, as shown in FIG. 6. In this state, the latch structure 37 protrudes into the runner 56 so as to fix the keypad 5 in the recess 31, and the conductive layer 97 of the bolt 9 contacts with the metal piece 538 to establish an electrical connection between the main PCB 65 and the black PCB 86. A touch screen input mode of the mobile phone 1 is thus achieved.

In the present invention, a fingerhole 120 is also provided in the top surface 210 of the recess 31, which is adapted for operating the keypad 5. In addition, a pair of function keys 400 can be provided between the recess 31 and the display 35. Optionally, the keypad 5 can be firstly rotated round the bolts 7, 9 and then pushed upwardly to be received in the recess 31 when changing from one input mode to another input mode.

It is understood that the invention may be embodied in other forms without departing from the spirit thereof. Thus, the present examples and embodiment are to be considered in all respects as illustrative and not restrictive, and the invention is not to be limited to the details given herein.

What is claimed is:

1. A mobile phone having a receiver, at least one transmitter and a display, said mobile phone comprising:
  a main body having a housing with a recess defined in a lower portion thereof, and a main printed circuit board (PCB) received in the housing;
  a keypad portion received in said recess comprising a front panel with a key operating section, a back panel with a touch screen, and a keypad PCB between said front and back panels, wherein the keypad PCB comprises a front PCB, a back PCB and an insulative layer sandwiched between the front PCB and the back PCB; and
  at least one fastener to slidably and pivotally attach the keypad portion to the main body so that the keypad portion can be reversed from one side to another side, whereby a switch of input modes is attained by changing an electrical connection between the main PCB and the front and back PCBs.

2. The mobile phone as claimed in claim 1, wherein at least a latch structure is provided in the recess to fix the keypad portion in the recess.

3. The mobile phone as claimed in claim 2, wherein a plurality of function keys is provided between the recess and the display.

4. A mobile phone having a receiver, at least one transmitter, and a display, said mobile phone comprising:
  a main body having a housing with a recess defined in a lower portion thereof; and
  a keypad portion comprising a front panel with a key operating section, and a back panel with a touch screen; wherein
  the keypad portion is slidably and pivotally received in said recess of the main body so that the keypad can be reversed from one side to another side, whereby a switch of input modes is attained.

5. The mobile phone as claimed in claim 4, wherein a pair of engaging holes is symmetrically formed in bottom ends of the housing and a pair of runners is formed in two lateral sides of the keypad portion.

6. The mobile phone as claimed in claim 5, wherein a pair of fasteners extend through the corresponding engaging holes into the corresponding runners.

7. The mobile phone as claimed in claim 4, wherein said recess is defined by a top surface and two sidewalls of the housing.

8. The mobile phone as claimed in claim 7, wherein at least one latch structure is provided in the sidewalls of the housing to fix the keypad portion in the recess.

9. The mobile phone as claimed in claim 8, wherein a main printed circuit board (PCB) is received in the housing of the main body and a keypad PCB is received between the front and back panels of the keypad portion.

10. The mobile phone as claimed in claim 9, wherein the keypad PCB comprises a front PCB, a back PCB and an insulative layer sandwiched between the front PCB and the back PCB.

11. The mobile phone as claimed in claim 10, wherein the pair of fasteners each comprises a head portion, a neck portion and a tail portion, and a conductive layer is formed, along a circumferential direction on one part of a surface of the tail portion, on the neck portion, and on a surface connecting the neck portion with the tail portion of at least one of said fasteners.

12. The mobile phone as claimed in claim 11, wherein two elastic tongues are respectively provided in the sidewalls adjacent to the engaging holes and at least one of the elastic tongues electrically connects with the main PCB.

13. The mobile phone as claimed in claim 12, wherein two ends of at least one runner each have two separate metal pieces, and at least a metal piece at one end connects to the front PCB and at least a metal piece of the other end connects to the back PCB.

14. The mobile phone as claimed in claim 4, wherein a plurality of function keys is provided between the recess and the display.

15. The mobile phone as claimed in claim 4, wherein a fingerhole is provided on the top surface of the recess of the housing for manipulating the keypad.

16. A hybrid type electronic device comprising:
  a main body; and
  an operation pad including opposite front and back panels with a key operating section and a touch screen respectively, said operation pad being slidably and rotatable relative to the main body between first and second operation positions to expose said front panel and said back panel, respectively, for easy access from an exterior.

17. The device as claimed in claim 16, wherein said main body defines a cavity to receive said operation pad.

18. The device as claimed in claim 16, wherein said operation pad slides along a front-to-back direction, and rotates about an axis perpendicular to said front-to-back direction.

19. The device as claimed in claim 16, wherein said operation pad is constantly linked to the main body in either said two operation positions or during switching between said two operation positions.

20. The device as claimed in claim 16, wherein said main body includes a phone receiver and a display thereon.

21. A method of using a hybrid type electronic device, comprising steps of:
provided a main body with an operation pad movably mounted on a specific region thereof; and
sliding and rotating the operation pad, thereby mutually exclusively having a first face of the operation pad facing outwardly for a key input use or having a second face of the operation pad facing outwardly for a touch input use.

22. The method as claimed in claim 21, wherein the operation pad is located in said same specific region either for the key input use or for the touch input use.

* * * * *